United States Patent [19]
Vershure, Jr.

[11] Patent Number: 4,979,362
[45] Date of Patent: Dec. 25, 1990

[54] AIRCRAFT ENGINE STARTING AND EMERGENCY POWER GENERATING SYSTEM

[75] Inventor: Roy W. Vershure, Jr., Escondido, Calif.

[73] Assignee: Sundstrand Corporation, Rockford, Ill.

[21] Appl. No.: 353,050

[22] Filed: May 17, 1989

[51] Int. Cl.⁵ ............................................... F02C 7/277
[52] U.S. Cl. .................................. 60/39.142; 60/39.33
[58] Field of Search ............... 60/39.142, 39.15, 39.33, 60/712, 727; 192/48.9, 48.91, 87.14, 87.16; 244/58

[56]  References Cited
U.S. PATENT DOCUMENTS

| | | | |
|---|---|---|---|
| 2,611,239 | 9/1952 | Briggs | 60/39.27 |
| 3,145,532 | 8/1964 | Moss | 60/39.142 |
| 3,416,309 | 12/1968 | Elmes et al. | 60/39.142 |
| 3,662,544 | 5/1972 | Kahn et al. | 60/39.142 |
| 3,965,673 | 6/1976 | Friedrich | |
| 4,777,793 | 10/1988 | Weigand et al. | 60/727 |
| 4,815,277 | 3/1989 | Vershure et al. | 60/39.142 |

Primary Examiner—Louis J. Casaregola
Attorney, Agent, or Firm—Wood, Phillips, Mason, Recktenwald & VanSanten

[57] ABSTRACT

The problem of excessive weight in an aircraft 10 powered by at least one turbine engine 12 as a result of the incorporation of both a starter for the turbine engine 12 and a source of emergency power is avoided by utilizing a turbine wheel 62 to alternatively start the engine 12 or drive an emergency power generator 102. The turbine wheel 62 may be driven either by compressed air from a ground source 34 or an engine bleed 32 or, in the alternative, by hot gases of combustion from a stored energy source 36 in an emergency situation.

10 Claims, 1 Drawing Sheet

AIRCRAFT ENGINE STARTING AND EMERGENCY POWER GENERATING SYSTEM

FIELD OF THE INVENTION

This invention relates to turbine engines, and more specifically, to a system that may be alternatively employed to start a turbine engine on an aircraft or to provide power aboard such aircraft in an emergency situation.

BACKGROUND OF THE INVENTION

In so-called "fly-by-wire" aircraft, control surfaces on the aircraft airfoils are not directly mechanically coupled to the controls operated by the pilot. Rather, the couplings are via electrical and/or hydraulic circuits. Needless to say, in order for such couplings to be operative, electrical energy and/or hydraulic fluid under pressure must be available at all times. If there is a failure in an electrical generating system or in a hydraulic pump, the link between the controls and the control surfaces is lost and the aircraft can no longer be controlled.

In the usual case, electrical energy and/or pressurized hydraulic fluid is supplied by one or more pumps or generators driven by the turbine engines used for propulsion of the aircraft, either by thrust or by rotating airfoils. Such turbine engines are equipped with a so-called "AMAD" which is an airframe mounted accessory drive unit. Should the engine, or engines in the case of multiple-engine aircraft, flame out, accessories such as the hydraulic pumps and/or electrical generators driven through the AMAD are no longer driven and control of the aircraft will be lost for the reasons stated.

To avoid this problem, various sorts of emergency power unit systems have been proposed. The purpose of such systems is to provide electrical and/or hydraulic power in the event of an emergency wherein power is not available from the principal power source. The emergency power then provides a link between the control surfaces and the controls allowing the pilot of the aircraft to recover control. Having once recovered control of the aircraft, the pilot may then go about restarting the main propulsion engine or engines.

At the same time, weight in airborne systems is always a concern with every effort being made to minimize weight so as to maximize range and/or payload of the aircraft. Turbine engines used for propulsion, like other engines, require some means of starting them. Not infrequently, a so-called ATSM is connected to each AMAD. An ATSM is an air turbine starter motor and typically includes a turbine wheel connected to the AMAD through which it may drive the main propulsion turbine up to a sufficient speed where it may maintain its own operation. In the usual case, the ATSM is driven by compressed air from any suitable source. Typically, a ground based compressor system such as a so-called ground cart may provide the compressed air. Alternatively, where multiple engines are utilized, the compressed air may be supplied by cross bleed from an already operating engine.

SUMMARY OF THE INVENTION

It is the principal object of the invention to provide a new and improved aircraft engine starting and emergency power generating system wherein a single turbine may be alternatively employed for turbine engine starting purposes or for emergency power generation.

An exemplary embodiment of the invention achieves the foregoing object in a system that is intended for use with an airframe mounted accessory drive unit or AMAD associated with a turbine engine. The system includes a rotary turbine wheel. A clutch is connected to the turbine wheel and has selectively operable first and second rotary outputs, one adapted to be connected as an input to an AMAD and the other adapted to be connected as an input to a power generating apparatus. A nozzle structure is provided for the turbine wheel and is adapted to direct compressed air from a source as a bleed air outlet of a turbine engine or a ground based compressor system, or hot gases of combustion at the turbine wheel. A combustor is connected to the nozzle and a fuel supply is connected to the combustor to provide fuel thereto for combustion therein. A storage tank is also provided for containing an oxidant for the fuel and is connected to the combustor to provide oxidant thereto to support combustion of the fuel therein.

As a consequence of the system, the turbine wheel may be driven by compressed air or by hot gases of combustion with the turbine wheel coupled to the AMAD by the clutch to act as a conventional or emergency starter for a turbine engine associated therewith or, in the alternative, the turbine wheel may be driven by hot gases of combustion with the turbine wheel coupled to a power generating apparatus by the clutch to act as an emergency power unit.

In one embodiment of the invention, the clutch is connected to the turbine by a transmission. Preferably, the transmission is a planetary transmission.

The invention contemplates that the clutch be a two-way clutch. In a highly preferred embodiment of the invention, the two-way clutch is a dump and fill fluid coupling.

The invention contemplates the power generating apparatus be either an electrical generator or a hydraulic pump or both.

In a highly preferred embodiment of the invention, the nozzle structure is a dual nozzle structure having a first nozzle for directing compressed air and a second nozzle for directing gases of combustion. The invention contemplates that the turbine wheel be a radial inflow turbine wheel and that the first and second nozzles be annular and in side by side relation along the axis of rotation of the turbine wheel.

Other objects and advantages will become apparent from the following specification taken in connection with the accompanying drawings.

DESCRIPTION OF THE PREFERRED EMBODIMENTS

Figure 1:
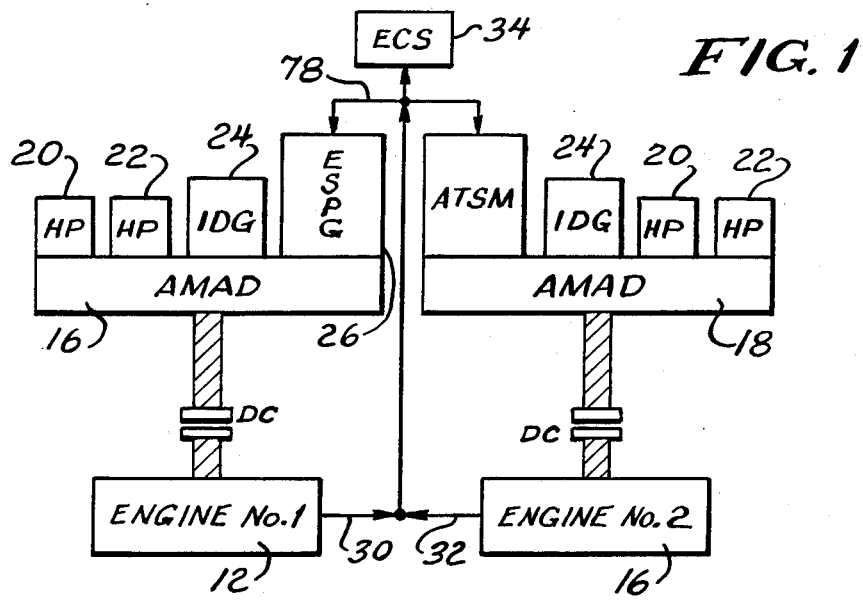
FIG. 1 is a block diagram of certain systems of a multiple turbine engine propelled aircraft and embodying the invention.

An exemplary embodiment of an aircraft engine starting and emergency power generating system is intended for use in a so-called "fly-by-wire" aircraft and may be advantageously employed in one having multiple turbine engines for propulsion as schematically illustrated in FIG. 1. However, it is to be understood that the invention may be advantageously employed in a single turbine engine powered aircraft as well.

Referring to FIG. 1, the aircraft is shown schematically at 10 and includes first and second turbine engines 12 and 14 respectively for propulsion purposes. Generally, the engines 12 and 14 will propel the aircraft 10 by means of thrust but the invention contemplates that they may be coupled to airfoils such as propellers or unducted fans for propulsion purposes as well.

Each of the engines 12 and 14 is coupled to a respective AMAD 16, 18 or airframe mounted accessory drive unit. As is well known, the AMADs 16 and 18 are gear boxes ultimately connected to a turbine driven shaft associated with the respective engines 12 and 14. Each AMAD 16, 18, mounts several accessories. For example, and as illustrated in FIG. 1, each AMAD 16, 18, mounts and drives a pair of hydraulic pumps 20, 22 as well as an integrated drive generating system 24 of known construction for providing electrical power to other aircraft systems. As illustrated in the drawing, an emergency starting and power generating system shown at 26 is associated with AMAD 16 while a conventional ATSM or air turbine starter motor 28 is associated with the AMAD 18.

Each of the engines 12, 14, has provision for the supply of bleed air on lines 30, 32 and provision is also made for possible hook-up to a ground based supply of compressed air 34 such as a ground cart or the like. Through suitable valving of a conventional nature, bleed air, which will be under compression, may be taken from either of the engines 12 and 14 and supplied to either the engine starting and emergency power generating system 26 or the ATSM 28 to start the other engine. Alternatively, compressed air may be taken from the ground source 34 for the same purpose.

Figure 2:
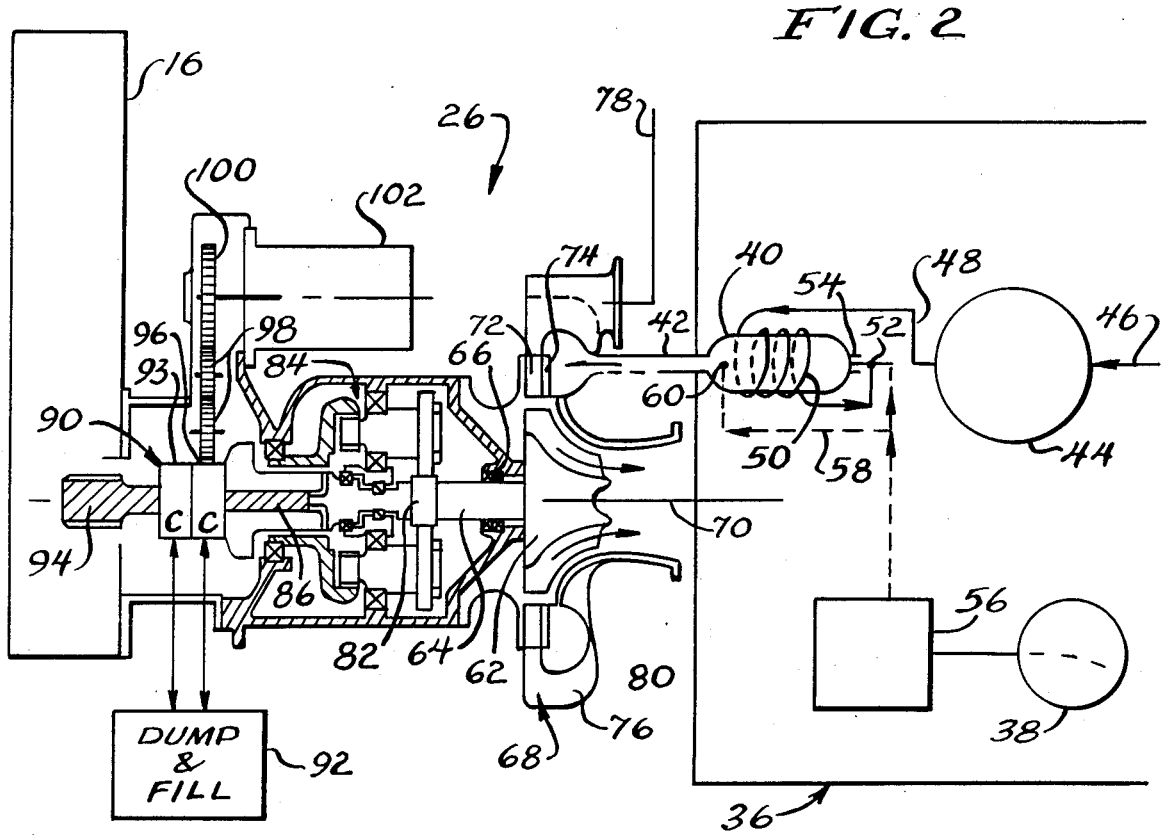
FIG. 2 is a somewhat schematic view of an aircraft engine starting and emergency power generating system made according to the invention.

Turning to FIG. 2, the engine starting and emergency power generating system 26 of the invention will be described in greater detail. The same includes a stored energy system, generally designated 36, which in turn includes a tank or storage vessel 38 for a combustible fuel such as JP4 fuel that may be also used to power the engines 12 and 14. Also included is a two-stage combustor 40 which may be in the form of a vessel that can (a) house the reaction whereby fuel from the tank 38 is oxidized and (b) the vaporization of additional fuel from the tank 38 as a result of exposure to the hot gases of combustion resulting from oxidation of the fuel. The resulting hot gases of combustion and vaporized fuel may exit the combustor 40 via a duct 42.

The two stage combustor 40 may be of the type disclosed in the commonly assigned application of Shekleton, Ser. No. 123,303, filed Nov. 20, 1987 and entitled Hot Gas Generator of the construction disclosed in the commonly assigned application of Shekleton, Brower and Vershure (attorneys docket no. B02902-AT6) forwarded Nov. 15, 1988, and entitled Staged, Co-Axial, Multi-Point Fuel Injection in a hot gas generator", the details of both of which are herein incorporated by reference.

The stored energy system 36 also includes a pressure vessel 44 for housing an oxidant for fuel contained in the tank 38. The oxidant may be compressed air, oxygen enriched air, or even pure oxygen. When the aircraft 10 is equipped with a so-called OBIGGS or on board inert gas generating system, the stream of oxygen enriched air that is usually dumped overboard may be passed from the OBIGGS along a line 46 to the vessel 44 for storage therein as more fully explained in my commonly assigned co-pending application Ser. No. 133,492, filed Dec. 14, 1987, and entitled Dual Function Gas Generation System for an onboard installation on turbine powered aircraft, the details of which are herein incorporated by reference.

The vessel 44 includes an outlet line 48 which extends to a tubular heat exchanger 50 that surrounds the combustor 40 and which is in good heat transfer relation thereto. Oxidant leaving the vessel 44 thus serves to cool the combustor 40. After so doing, the same is combined with fuel at a junction 52 connected to an inlet 54 for the combustor 40. Thus, a mixture of fuel from the tank 38 and oxidant from the vessel 44 is introduced into the combustor 40 so that the fuel may be oxidized therein. Control of the fuel flow from the tank 38 is exercised by a controller 56 of known type. A certain amount of the fuel flowing toward the junction 52 from the controller 56 may be diverted along a line 58 to be injected into the combustor 40 at a relatively downstream location 60 just upstream of the outlet 42 so as to be vaporized by the hot gases of combustion resulting from the injection of oxidant and fuel at the inlet 54. Such vaporized fuel increases the volume of gas leaving the combustor 40 through the outlet 42 for purposes to be seen.

A radial inflow turbine wheel 62 includes an output shaft 64 which is journaled by bearings 66. An annular nozzle structure, generally designated 68, surrounds the radially outer periphery of the turbine wheel 62 and is a dual nozzle structure. Specifically, in side by side relation along the rotational axis 70 of the turbine wheel 62 there is a first nozzle 72 and a second nozzle 74. Both of the nozzles are intended to direct gas at the turbine wheel 62 to drive the same. More particularly, the nozzle 72 is in fluid communication with a plenum 76 into which compressed air may be introduced on a line 78. The line 78 is illustrated in FIG. 1 and it will be appreciated that compressed air from the bleed air line 32 of the engine 14 or from the ground source 34 may be directed to the line 78.

A second plenum 80 is connected to the second nozzle 74 and is in fluid communication with the outlet 42 of the combustor 40. Thus, hot gases of combustion from the combustor 40, along with such vaporized fuel as may be introduced at the point 60, may be directed via the second nozzle 74 against the turbine wheel 62 to drive the same.

The shaft 64 mounting the turbine wheel 62 mounts the sun gear 82 of a reduction planetary gear transmission, generally designated 84. The planetary gear transmission is connected via an output shaft 86 to a two-way clutch 90 which preferably is a dump and fill fluid coupling as schematically illustrated at 92 and which has a clutch input housing 93.

In any event, the two-way clutch 90 includes a first output shaft 94 within the AMAD 16 and in driving relation thereto. By means of this connection, rotational power conveyed to the shaft 94 through appropriate selective engagement of the clutch 90 can be employed to drive the engine 12 for start up purposes.

A second output 96 from the clutch input housing 93 extends directly to a gear train shown somewhat schematically at 98 and ultimately to a drive gear 100 for a power generator 102. The power generator 102 may be an electrical generator, a hydraulic pump, or both. Consequently, whenever the clutch input housing 93 is engaged it will provide power to the second output 96, and the power generator 102 will be driven.

When it is desired to start the engine 12 in a normal starting procedure, the clutch 90 is actuated so that power will be conveyed to the first output 94. Compressed air from the ground source 34 or from the bleed air line 32 for the engine 14 if the engine 14 is operating is directed to the line 78 and applied via the first nozzle 72 to drive the turbine wheel 62. As a consequence, rotation of the turbine wheel 62 will cause rotation of the output 94 with the result that the turbine of the engine 12 will be driven by reason of its connection to the AMAD 16. The entire system will accelerate to the point where operation of the engine 12 becomes self-sustaining at which time, flow of compressed air to the nozzle 72 may be halted and the output shaft 94 disengaged from the transmission 84.

In a typical emergency situation, electrical and/or hydraulic power will be unavailable from the pumps 20, 22 or the integrated drive generators 24. This in turn means that where the aircraft 10 is a single engine aircraft, the sole engine will be inoperative at that point. Similarly, if the aircraft 10 is a multiple engine aircraft, it will mean that all engines are inoperative.

In order to provide hydraulic and/or electrical power to complete the link between the controls and the control surfaces of the aircraft so as to enable the pilot to recover control of the aircraft, the stored energy system 36 is fired. In particular, fuel from the tank 38 and oxidant from the vessel 44 are directed to the combustor 40 and combusted therein. The hot gases of combustion will vaporize additional fuel admitted into the combustor 40 at the point 60 and the resulting hot gases will be directed via the second nozzle 74 against the turbine wheel 62 to drive the same and rapidly bring the same up to speed. At this time, the clutch 90 will be selectively engaged so that the second output 96 will provide rotational power to the power generator 102 to drive the same. Upon being driven, the power generator 102 will provide power to enable the controls and the control surfaces to be linked and the pilot to again acquire control over the aircraft. Preferably, the system is designed with minimum rotor inertia so that power will be available from the power generator 102 in about two seconds or less from the time the stored energy system 36 is fired.

Once control of the aircraft 10 has been regained, consumption of power being provided by the power generator 102 is minimized and the clutch 90 engaged so that the first output 94 is driven. This will, through the AMAD 16, drive the turbine of the engine 12 and bring the same up to a speed whereat it may be started. For the type of system illustrated in FIG. 1, once the engine 12 has been restarted, bleed air from the bleed air line 30 may then be directed to the ATSM 28 so as to allow initiation of the starting procedure for the engine 14. However, it should be understood that if desired in a two engine aircraft, the ATSM 28 could be replaced with a turbine wheel, transmission and clutch assembly much like that illustrated in FIG. 2 and driven off the same or different stored energy system 36 as desired.

From the foregoing, it will be appreciated that the invention provide an on-board emergency main engine starting capability through the use of the stored energy system and without resorting to the use of an on-board auxillary power unit. In aeronautical applications, the resulting weight saving is considerable. In addition, the emergency power unit feature of the invention is utilized to allow the establishment of stable flight prior to any attempted restart of the main engine or engines, minimizing workload.

The invention is also susceptible to use in aircraft having electric motor driven hydraulic actuators in close proximity to the aircraft control surfaces. In such a case, initial electric power following a flame out of the main engine or engines could be provided to such electric motor driven hydraulic actuators from the aircraft battery system to provide stabilization of the various control surfaces. The generator employed in the invention could therefore be downsized to the point to provide for only recharging of the battery systems and provide a further reduction in inertia, physical volume and weight of the total system.

I claim:

1. An aircraft engine starting and power generating system for use with an airframe mounted accessory drive unit (AMAD) associated with a turbine engine comprising:

a rotary turbine wheel;

a clutch connected to said turbine wheel and having selectively operable first and second rotary outputs, one adapted to be connected as an input to an AMAD and the other connected as an input to a power generating apparatus;

a nozzle structure for said turbine wheel and adapted to direct compressed air from a source such as a bleed air outlet of a turbine engine or a ground based compressor system, or hot gases of combustion at said turbine wheel;

a combustor connected to said nozzle;

a fuel supply connected to said combustor to provide fuel thereto for combustion therein; and a storage tank for containing an oxidant and connected to said combustor to provide oxidant thereto to support combustion of the fuel therein;, whereby said turbine wheel may be driven by compressed air or by hot gases of combustion and said turbine wheel coupled to an AMAD by said clutch, to act as a conventional or emergency starter for a turbine engine associated therewith, or said turbine wheel may be driven by hot gases of combustion and said turbine wheel coupled to a power generating apparatus by said clutch to act as an emergency power unit.

2. The aircraft engine starting and power generating system of claim 1 wherein said clutch is connected to said turbine wheel by a planetary transmission.

3. The aircraft engine starting and power system of claim 1 wherein said clutch is a two-way clutch.

4. The aircraft engine starting and power generating system of claim 3 wherein said clutch is a dump and fill fluid coupling.

5. The aircraft engine starting and power generating system of claim 1 wherein said power generating apparatus is an electrical generator.

6. The aircraft engine starting and power generating system of claim 1 wherein said power generating apparatus is a hydraulic pump.

7. The aircraft engine starting and power generating system of claim 1 wherein said nozzle structure is a dual nozzle structure having a first nozzle for directing compressed air and a second nozzle for directing gases of combustion.

8. The aircraft engine starting and power generating system of claim 7 wherein said turbine wheel is a radial inflow turbine wheel and said first and second nozzles are annular and in side by side relation along the axis of rotation of said turbine wheel.

9. An aircraft engine starting and power generating system for use with an airframe mounted accessory drive unit (AMAD) associated with a turbine engine comprising a rotary turbine wheel;

a transmission connected to said turbine wheel;

a two-way clutch connected to said transmission and having first and second rotary outputs, one adapted to be connected as an input to an AMAD and, the other connected as an input to a power generating apparatus such as an electrical generator and/or a hydraulic pump;

a dual nozzle for said turbine wheel and having a first nozzle adapted to direct compressed air from a source such as a bleed air outlet of a turbine engine or a ground based compressor system at said turbine wheel and a second nozzle for directing hot gases of combustion at said turbine wheel;

a hot gas generator connected to said second nozzle;

a fuel supply connected to said hot gas generator to provide fuel thereto for combustion therein; and a storage tank for containing an oxidant and connected to said hot gas generator to provide oxidant thereto to support combustion therein;

whereby said turbine wheel may be driven by compressed air or by hot gases of combustion and said transmission coupled to an AMAD by said clutch to act as a conventional or emergency starter for a turbine engine associated therewith, or said turbine wheel may be driven by hot gases of combustion and said transmission coupled to a power generating device by said clutch to act as an emergency power unit.

10. The aircraft engine starting and power generating system of claim 9 in combination with a turbine engine having an AMAD coupled to a turbine of said turbine engine, said one rotary output being connected to said AMAD and being selectively drivable by operation of said clutch to drive said turbine of said turbine engine.

* * * * *